United States Patent [19]

Oldershaw

[11] Patent Number: 4,724,489
[45] Date of Patent: Feb. 9, 1988

[54] ELECTRONIC IMAGE GENERATION

[75] Inventor: Robert J. Oldershaw, Norfolk, England

[73] Assignee: Crosfield Electronics Limited, London, England

[21] Appl. No.: 922,618

[22] Filed: Oct. 24, 1986

[30] Foreign Application Priority Data

Oct. 31, 1985 [GB] United Kingdom ............... 8526817

[51] Int. Cl.$^4$ .................... H04N 1/21; H04N 1/387
[52] U.S. Cl. .................................. 358/284; 358/78; 358/80
[58] Field of Search ............. 358/284, 282, 293, 21 R, 358/75, 78, 80

[56] References Cited

U.S. PATENT DOCUMENTS

| | | |
|---|---|---|
| 2,962,548 | 11/1960 | Taudt . |
| 4,054,916 | 10/1977 | Knop .................... 358/284 |
| 4,092,668 | 3/1978 | Knop .................... 358/282 |
| 4,319,268 | 3/1982 | Yamada ................ 358/21 R |
| 4,377,820 | 3/1983 | Reitmeier ............. 358/21 R |
| 4,381,519 | 4/1983 | Wilkinson ............. 358/21 R |
| 4,484,230 | 11/1984 | Pugsley ................ 358/284 |
| 4,520,395 | 5/1985 | Abe ...................... 358/282 |
| 4,651,287 | 3/1987 | Tsao ..................... 358/284 |

FOREIGN PATENT DOCUMENTS

| | | |
|---|---|---|
| 0053935 | 6/1982 | European Pat. Off. . |
| 712499 | 7/1954 | United Kingdom . |
| 2114853 | 8/1983 | United Kingdom . |

Primary Examiner—Tommy P. Chin
Attorney, Agent, or Firm—Sughrue, Mion, Zinn, Macpeak and Seas

[57] ABSTRACT

A method of generating an electronic representation of an original image (2) comprises illuminating the image (2) with a scanning beam; causing relative movement between the scanning beam impinging on the image and the image (2) whereby the original image (2) is scanned in a series of overlapping scan lines. The scanning beam is caused to impinge on one or more arrays of radiation sensitive elements (14-16), each array having dimensions smaller than the dimensions of the image (2), and the elements being sensitive to the intensity of respective portions of the incident beam received from corresponding pixels of the original image within a scan line at least some of which extends transversely to the scanning direction. The sensed intensities are regularly monitored and data related to the intensities monitored in a predetermined number n of the monitoring steps is stored in a memory (20). A predetermined algorithm, such as an edge enhancement, is applied to the stored data to generate enhanced image data and part of the stored data is replaced with the enhanced image data.

10 Claims, 5 Drawing Figures

ELECTRONIC IMAGE GENERATION

FIELD OF THE INVENTION

The invention relates to methods for scanning an image and for generating an electrical representation of the image, typically in digital form.

DESCRIPTION OF THE PRIOR ART

In conventional electronic scanning apparatus an original image is scanned pixel by pixel by means of an electro-optical system to derive one or more signals representing the densities or transmittances of the successively scanned pixels. If a monochrome image is scanned then a single picture signal will be generated whereas if a coloured image is scanned then a number of picture signals will be generated corresponding to each colour component, for example cyan, magenta, and yellow. These electronic signals, after modification may be displayed on an image monitor, stored for later use, and/or used to control the exposure of an output medium to one or more exposing light beams.

One enhancement which is often carried out on the picture signals is edge enhancement, commonly known as "unsharp masking". The purpose of unsharp masking is to increase the sharpness of boundaries in the image and it may additionally introduce a narrow fringe. An example of image generating apparatus in which unsharp masking is carried out is illustrated in GB-A-712,499. In this apparatus, an image is exposed to a light beam which passes through a lens and is divided into two subsidiary light beams which are passed through narrow and wide apertures respectively to detectors. The beam passing through the narrow aperture is used to generate the sharp signal for each element of the image while the beam passing through the wide aperture is used to generate the unsharp signal. These signals are then combined in a predetermined manner to enhance the final image. This use of different sized apertures requires accurate positioning of the apertures and leads to a complicated construction.

In this known apparatus, the size of the scanning spot is fixed by the aperture or apertures prior to scanning and remains this size during scanning. The size of the apertures governs to some extent the original sampled size and thus the resolving power of the scanner.

In other examples, such as is described in U.S. Pat. No. 4,319,268 and GB-A-2,114,853 a single aperture is used to generate the sharp signal (S) and the unsharp signal (U) is derived from a set of sharp signals. However, this requires a large memory store for storing line sets of the sharp signals and if the ratio of the unsharp aperture to the sharp aperture is large, calculating the value of U requires the use of high speed video digital processors. Typically, a single scan line of an image in the scanning direction comprises 16000 data bytes and to generate enough information for calculating the value U a store having a size 16 K×(No of lines in unsharp aperture) is required, e.g. 32×16 K.

SUMMARY OF THE INVENTION

In accordance with the present invention, a method of generating an electronic representation of an original image comprises illuminating the image with a scanning beam; causing relative movement between the scanning beam impinging on the image and the image whereby the original image is scanned in a series of overlapping scan lines; causing the scanning beam to impinge on at least one array of radiation sensitive elements, each array having dimensions smaller than the dimensions of the image, and the elements being sensitive to the intensity of respective portions of the incident beam received from corresponding pixels of the original image within a scan line, at least some of the elements extending transversely to the scanning direction; regularly monitoring the sensed intensities and storing data related to the intensities monitored in a predetermined number n of the monitoring steps; applying a predetermined algorithm to the stored data to generate enhanced image data; and replacing part of the stored data with the enhanced image data.

The invention is particularly applicable to edge enhancement such as unsharp masking. It avoids the need for large line stores (as previously required for example in GB-A-2,114,853) by scanning with overlapping scan lines and reduces the complexity of digital processors required.

Preferably, the data is stored in a memory, such that (for example after each monitoring step) the oldest set of data is read out of the memory prior to the step of storing the newest set of monitored data. In one example, the steps of applying a predetermined algorithm and replacing part of the stored data with enhanced image data are carried out after each monitoring and storing step. In other examples these steps may be applied after more than one of the monitoring and storing steps.

Preferably, the method further comprises defining the stored data to which the algorithm is applied in accordance with a predetermined control function.

For example, in the case of unsharp masking the unsharp and/or sharp apertures may be changed in accordance with the system response. Where the radiation sensitive elements comprise photomultipliers, the apertures may be varied to take account of the variation in frequency response with intensity.

Preferably, the method further comprises monitoring a characteristic of the original image; and defining the stored data to which the algorithm is applied according to the monitored characteristic.

This represents a particularly advantageous arrangement enabling dynamic changes to be made in real time (on the fly) in the data to which the algorithm is applied during scanning. For example in the case of edge enhancement the sizes of the "apertures" defined for the sharp signal and the unsharp signal can be changed, the "apertures" corresponding to different groups of stored data and so be different for different parts of the image.

In one example, the monitored characteristic comprises the granularity of the portion of the original image being scanned. This may be achieved by monitoring the density of the portion of the original image being scanned and comparing the monitored density with a predetermined conversion function. The invention is useful in dealing with differences in granularity in the original image because it is important for unsharp masking that the unsharp aperture is greater than the grain size. The grain size increases with increasing density and this results in a decrease in the signal/noise ratio in the detected signal.

The array of elements could be two dimensional but preferably, the array of radiation sensitive elements is a linear array of, for example, charged coupled devices (CCD). CCD arrays have a very fast response and are particularly suitable for this application. Such an array of CCD elements enables apertures as small as 7μ to be chosen. This is advantageous over previous detectors since the area is so small that thermal noise is negligible.

The minimum size of the linear array, defined by the number of elements, will typically be equal to the maximum ratio of U:S multiplied by the "size" of S. "Size" in this context is the maximum number of array elements used to construct S.

Conveniently, if the number of pixels defining the maximum width of an unsharp aperture is m, and the number of monitoring steps n is equal to m. This will generate a square array of data values enabling for example the sharp signal to correspond with the centre element or group of elements of the matrix while the unsharp signal is chosen from a larger sample including the sharp sample.

Typically m will be 30 and n will also be 30.

The step of causing relative movement between a scanning beam and the image may be carried out by a conventional image scanning apparatus such as our Crosfield Magnascan 600 series or a flat bed scanning arrangement.

Typically, the enhanced image data may be fed directly or after further enhancement steps to an exposing system where it will control the exposure of a record medium to an exposing beam. The entire process of input scanning processing and output scanning can be carried out in real time.

BRIEF DESCRIPTION OF THE DRAWINGS

An example of a method according to the invention will now be described with reference to the accompanying drawings, in which.

DETAILED DESCRIPTION OF AN EMBODIMENT

Figure 1:
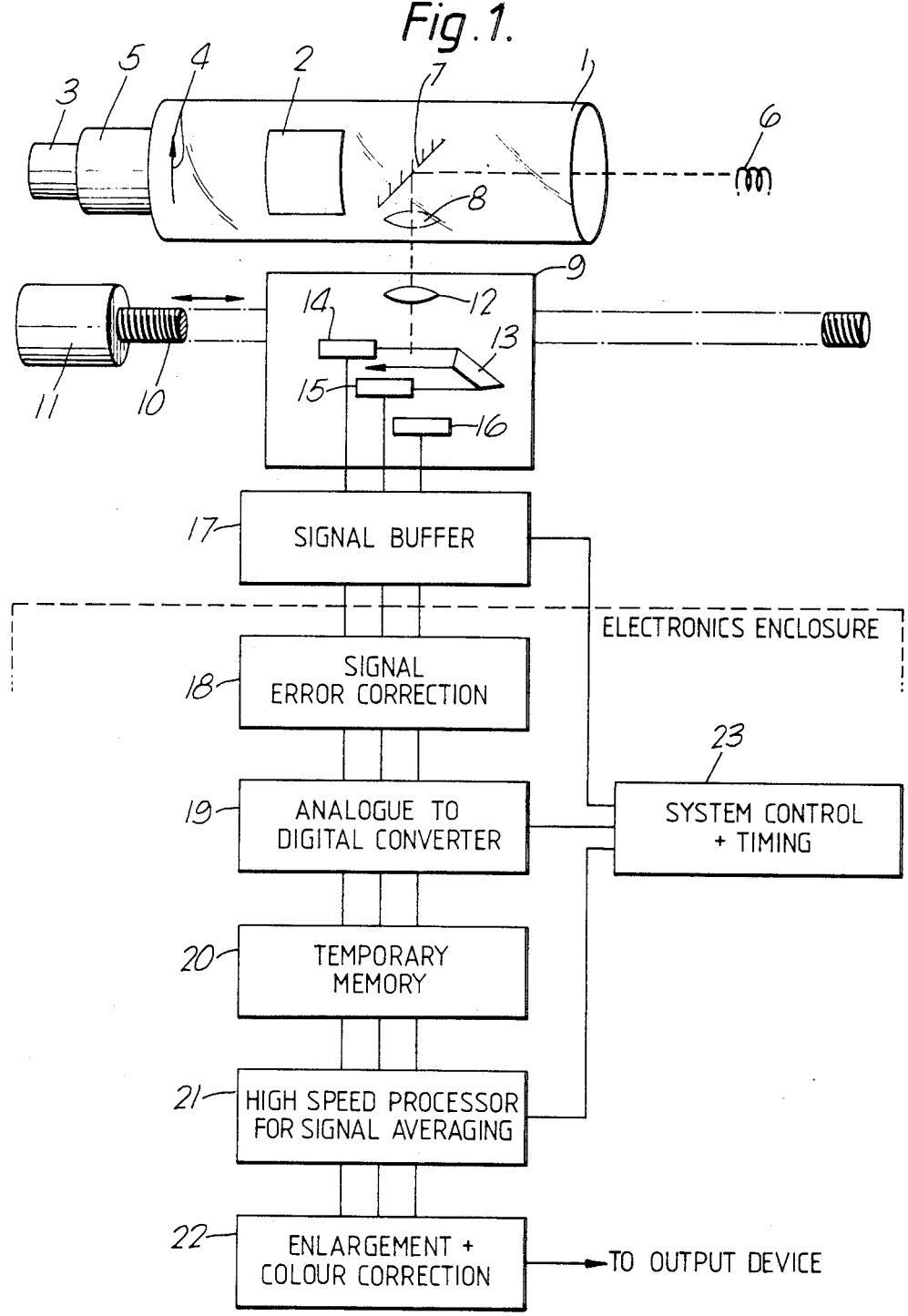
FIG. 1 is a schematic, block diagram of the apparatus.

The apparatus shown in FIG. 1 is similar to our Crosfield Magnascan 600 Series and comprises a perspex, transparent cylinder 1 for supporting an original image 2. The cylinder 1 is mounted to an axle 3 which is rotated in the direction of an arrow 4 by a motor 5. A light source 6 generates a light beam which is caused to pass into the cylinder 1 and impinge on a mirror 7 where it is reflected into a lens 8.

A scanning head 9 is mounted adjacent the cylinder 1 and is movable parallel with the cylinder 1 along a lead screw 10. The lead screw 10 is rotated by a motor 11. The scanning head 9 includes a lens 12 onto which the beam from the lens 8 impinges and a three way beam splitter 13. The beam splitter 13 divides the incident beam into three subsidiary beams which are fed via filters (not shown) to respective 'red', 'blue', and 'green' linear charge coupled device (CCD) arrays 14–16.

Each of the CCD arrays 14–16 is of a conventional form and each may comprise for example a Fairchild CCD 151. Each array contains a large number of photosensitive elements arranged in a linear fashion side by side, each of which generates an electrical charge corresponding to the intensity of the incident light beam.

Periodically, corresponding to each monitoring step, the photosensitive elements of each array 14–16 are discharged, the corresponding signals being fed to a signal buffer 17 and then to a signal error correction circuit 18. In the error correction circuit 18 correction is made for errors in the discharged signal resulting from thermal affects and the like. The corrected signals are then fed to an analogue to digital converter 19 and the digital equivalents are stored in a temporary memory 20 constitued by a RAM.

As will be described in more detail below, the contents of the RAM 20 are processed by a high speed processor 21 such as a microcomputer which then passes the three colour component signals to conventional enlargement and colour correction circuits indicated diagrammatically at 22. The outputs of these circuits 22 are then fed either to a store or directly to an output recording device of conventional form. The processor also provides system control and timing as indicated diagrammatically at 23.

In use, the motors 5, 11 are actuated to cause the scanning head 9 slowly to traverse along the lead screw 10 while the cylinder 1 is rotated at relatively high speed so that the original image is scanned in a succession of circumferential and overlapping scan lines. Each line of the original image causes all the elements in each CCD arary 14–16 to be exposed. The arrays 14–16 are arranged orthogonal to the scanning direction. The width of the circumferential line is determined by the relative speeds of the motors 5, 11.

The detected signals represent the transmittence of the image i.e. the perceived brightness. This is of the order 10,000:1 in range.

At frequent intervals corresponding to successive monitoring steps the contents of the CCD elements of each array 14–16 are discharged. The content of each element represents the colour component content of a single pixel of the original image. A signal representing the magnitude of the stored charge is then passed, as explained above, to the RAM 20 where it is stored with the other signals of the same set. At each monitoring step three sets of signals will be generated, one for each array.

Each scan line is offset from the preceding scan line by a single pixel although other spacings of more than one pixel could be used.

At the start of a scan line, the RAM 20 is filled with n sets of data from each array. Thereafter each new set of data replaces the oldest set in a first in-first out manner.

Figure 2:
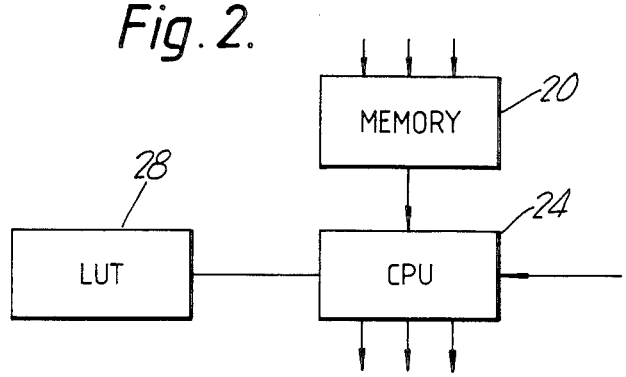
FIG. 2 is a block diagram of the high speed processor.

After the RAM 20 has been filled with three groups of n data sets an enhancement algorithm is applied after each monitoring step to each group. To achieve this the central processing unit 24 (FIG. 2) of the processor 21 is programmed to carry out the steps shown in FIG. 5.

Figure 5:
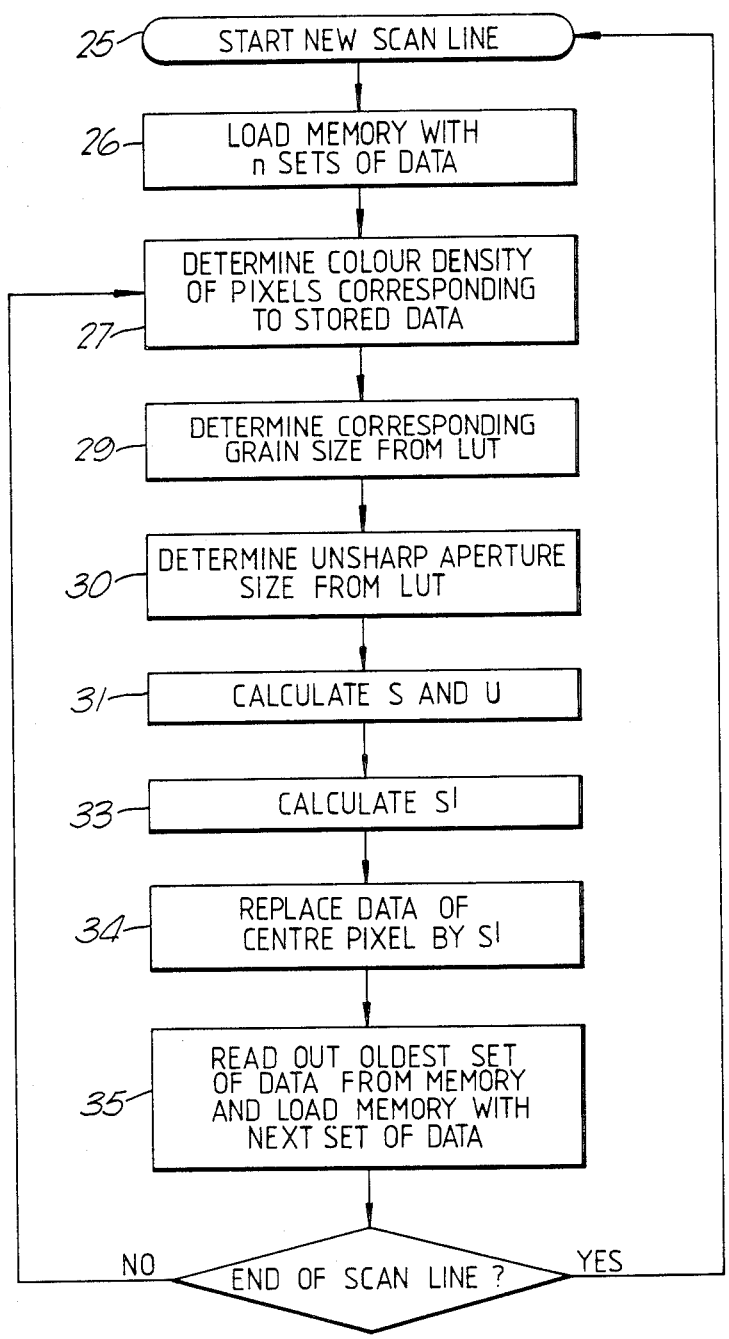
FIG. 5 is a flow diagram illustrating operation of the processor.

As shown in FIG. 5, at the start of a scan line 25, the RAM 20 is loaded with n sets of data 26. The CPU 24 then determines 27 from the data in the RAM 20 the colour component density of the pixels of the original image corresponding to the stored data. This could be achieved by averaging the contents of the stored data.

The density is related to the grain size of the printing ink used in the original image. To determine the corresponding grain size, the density value is used to address a look-up table (LUT) 28 (step 29) in which is stored an appropriate conversion function. This will be obtained from the ink manufacturer.

The size of an unsharp aperture is then determined 30 in terms of the number of pixels falling within the aperture. This is achieved by addressing another section of the LUT 28 with the grain size. This section stores unsharp aperture values which define apertures larger than the corresponding grain size. In this example the size of the sharp aperture is fixed but in other examples the sharp aperture size could also be defined at this stage.

An unsharp masking enhancement is to be applied of the form $S' = S + K(S - U)$ where K controls the amount of unsharp masking which is added, S is a sharp signal and U is an unsharp signal.

However this requires great accuracy in digital computation (13 bits).

It is normal to represent the data collected as the perceived density of the original copy where:

$$S_D = \log(1/S)$$

This results in being able to handle the original adequately with greater digital ease (8 bits) Then:

$$S'_D = S_D + K(S_D - U_D).$$

When unsharp masking is to be carried out only a small number m of the elements of each array 14–16 will be used. Typically, m will be in the order of 30. For simplicity, FIGS. 3 and 4 will illustrate the situation when m=7. At successive monitoring steps the contents of the CCD elements are read to generate values related to the charge which has accumulated in each element while being exposed to the exposing beam. This charge will relate to the colour component content of a corresponding pixel of the original image as explained above. This information is stored in digital form in the RAM 20 as an array having dimensions n×(no of CCD elements).

Sharp and unsharp values S, U are now determined from the contents of the RAM 20.

Figure 3:
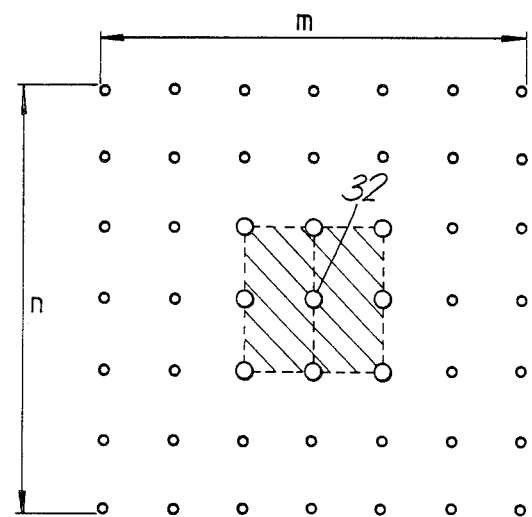
FIGS. 3 and 4 illustrate diagrammatically the temporary store shown in FIG. 1.

FIG. 3 illustrates the selection of the nine central elements (pixels) of the array in the RAM 20 as constituting the sharp aperture with the value S being calculated by summing the intensities stored in the nine locations of the memory and dividing by the number of locations (in this case 9).

Figure 4:
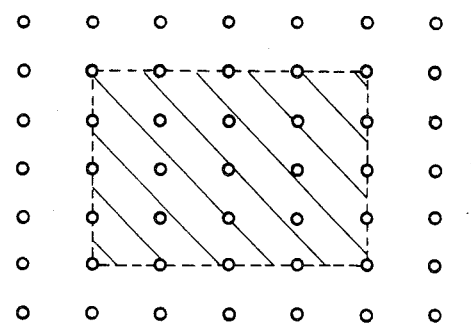

The unsharp signal U is determined in a similar manner but using the previously determined larger aperture, in this example, defined by a central array of five by five locations (pixels), as indicated in FIG. 4. The sharp signal U is determined as being equal to the sum of the values in the 25 locations divided by the number of pixels (i.e. 25). This is indicated at step 31.

The values of S and U are then applied to the formula set out above to derive a value of S' (step 33) which then replaces the data representing the intensity in the central location 32 illustrated in FIG. 3 (step 34).

Alternatively values of $S_D$, $U_D$ and $S'_D$ are determined from which S' is calculated.

During subsequent scans, new lines of intensity data are stored in the "bottom" of the memory, as seen in FIG. 3, with the oldest line of information, at the top of the memory, being discarded 35. After each new line of data is stored, the unsharp masking algorithm is applied in a similar manner to that just described.

When the end of a scan line is reached processing reverts to step 25.

The steps described above are carried out in parallel on each group of data in the RAM 20.

It will be appreciated that it is a very simple matter to vary the aperture from which the sharp and unsharp signals are derived by choosing the number of elements which are to be used for calculating those signals. This variation can be performed in real time between successive monitoring steps and in response to changes in a characteristics of the image such as granularity (as described).

In a modification, the unsharp masking and enhancement may be applied after a predetermined number of sets of monitoring steps. For example, this set of steps may correspond to the size in the "m" direction of the sharp sample or aperture. In this case, all the elements in the sharp sample would be replaced by the S' value.

The line store approach to collecting data described differs from the conventional approach in that the motor speeds are not chosen to achieve line butting.

I claim:

1. A method of generating an electronic representation of an original image, the method comprising illuminating said original image with a scanning beam; causing relative movement in a scanning direction between said scanning beam impinging on said original image and said original image whereby said original image is scanned in a series of overlapping scan lines; causing said scanning beam to impinge on at least one array of radiation sensitive elements, said at least one array having dimensions smaller than the dimensions of said original image, and said radiation sensitive elements being sensitive to the intensity of respective portions of said incident beam received from corresponding pixels of said original image within a scan line, at least some of said radiation sensitive elements extending transversely to said scanning direction; in a series of steps, regularly monitoring said intensities of said portions of said incident beam sensed by said radiation sensitive elements, and storing data related to said intensities monitored in a predetermined number n of said monitoring steps; applying a predetermined algorithm to said stored data to generate enhanced image data; and replacing part of said stored data with said enhanced image data.

2. A method according to claim 1, wherein said stored data is stored in a memory, and wherein an oldest set of said stored data is read out of said memory prior to the step of storing data related to said intensities monitored in a latest step.

3. A method according to claim 2, wherein said steps of applying said predetermined algorithm and replacing part of said stored data with said enhanced image data are carried out after each said regularly monitoring and storing step.

4. A method according to claim 1, further comprising monitoring a characteristic of said original image; and defining the stored data to which said algorithm is applied according to said monitored characteristic.

5. A method according to claim 4, wherein said monitored characteristics comprises a granularity of the portion of said original image being scanned.

6. A method according to claim 5, wherein said granularity is monitored by monitoring the density of said portion of said original image being scanned and comparing said monitored density with a predetermined conversion function.

7. A method according to claim 1, wherein said predetermined algorithm carries out an edge enhancement.

8. A method according to claim 7, wherein said stored data to which said algorithm is applied comprises a first set of said stored data corresponding to an array of pixels defining a sharp aperture, and a second set of said stored data corresponding to an array of pixels defining an unsharp aperture.

9. A method according to claim 1, wherein each said at least one array of radiation sensitive elements is a linear array of charged coupled devices.

10. A method according to claim 1, wherein each said scan line is offset from a preceding scan line by a single pixel.

* * * * *